United States Patent [19]

Namiki

[11] Patent Number: 4,542,422
[45] Date of Patent: Sep. 17, 1985

[54] ELECTROMAGNETIC TRANSDUCER HEAD ASSEMBLY

[75] Inventor: Yasuomi Namiki, Yokohama, Japan

[73] Assignee: Victor Company of Japan, Limited, Japan

[21] Appl. No.: 440,406

[22] Filed: Nov. 9, 1982

[30] Foreign Application Priority Data

Nov. 13, 1981 [JP] Japan .................. 56-168356[U]
Feb. 17, 1982 [JP] Japan .................. 57-22878

[51] Int. Cl.⁴ .............................. G11B 5/02
[52] U.S. Cl. ...................................... 360/67
[58] Field of Search ..................... 360/66, 68, 67

[56] References Cited

U.S. PATENT DOCUMENTS

| | | | |
|---|---|---|---|
| 2,980,768 | 4/1961 | Ehrer | 360/66 |
| 3,346,821 | 10/1967 | Swyryd | 360/66 |
| 3,347,996 | 10/1967 | Uchikoshi | 179/100.2 |
| 3,351,716 | 11/1967 | Hirota | 360/66 |
| 3,354,270 | 11/1967 | Smith et al. | 179/100.2 |
| 3,666,893 | 5/1972 | Fujiwara et al. | 360/66 |
| 3,723,669 | 3/1973 | Bose et al. | 179/100.2 |

FOREIGN PATENT DOCUMENTS 1221677 7/1966 Fed. Rep. of Germany ... 179/100.2
1201076 5/1972 France .............................. 179/100.2

OTHER PUBLICATIONS

Tietze/Schenk, Holbleiter-Schaltungs-Technik, 2nd Edition Springer-Verlag Berlin, Heidelberg, New York, 1971, p. 367.
Funkschau, vol. 50, No. 25, Dec. 1978, pp. 117-120, Munich, DE; G. Corinth: "Ein Hochwertiger Magnetton-Aufsprechverstärker", p. 118, Line 4–p. 120, Middle Column, Line 5, FIGS. 3-4.
IBM Technical Disclosure Bulletin, vol. 8, No. 3, Aug. 1965, pp. 359-360, New York, US; A. T. Germano et al., "Transducer Head Assembly Including Modified Field Effect Coupling", Whole Document.

*Primary Examiner*—Vincent P. Canney
*Attorney, Agent, or Firm*—Lowe, King, Price & Becker

[57] ABSTRACT

An electromagnetic transducer head assembly for use in magnetic recording comprises a ferromagnetic core structure (1'; 30) having a magnetic gap and a winding (1"; 31) mounted on the core structure. A capacitor (3; 34) is mounted in proximity to and connected to the winding to form a resonance circuit. An amplifier circuit (4; 38) is also mounted in proximity to and connected to the resonant circuit for generating an alternating current in the winding.

8 Claims, 7 Drawing Figures

ELECTROMAGNETIC TRANSDUCER HEAD ASSEMBLY

BACKGROUND OF THE INVENTION

The present invention relates generally to magnetic recording and reproducing apparatus, and particularly to a transducer head assembly suitable for high frequency biasing and erasing purposes.

The oscillator circuit used for supplying a high frequency bias current to a magnetic recording head or a high frequency erasing current to an erasure head is currently mounted on a main circuit board which is located away from such transducer heads. This requires shielded wires for establishing connections between them and entails a time consuming work effort during manufacture. A further disadvantage is that shielded wires tend to introduce a capacitance loss which results in a lower operating efficiency. A still further disadvantage is that the main circuit board cannot be reduced to a small size due to the installation of the oscillator circuit and its associated elements, placing a limitation on the size of the tape recording apparatus.

One prior art approach makes use of a separate circuit board on which the oscillator circuit is mounted to reduce the size of the main circuit board. However, this prior art still requires the use of shielded wires for interconnection. Furthermore, the conventional oscillator circuit employs a transformer having primary and secondary windings, which arrangement involves undesired loss of energy and places limitations on compact design.

SUMMARY OF THE INVENTION

The present invention provides an electromagnetic transducer head assembly which makes possible the reduction of the main circuit board of a tape recording-reproducing apparatus and the elimination of undesirable effects encountered in conventional apparatus.

The present invention contemplates to have the inductive element of a resonance circuit share a common space with a transducer head by installing the inductive element in proximity to the head or having the inductive element serve the function of the winding of the head as well.

According to a broader aspect of the invention, there is provided an electromagnetic transducer head assembly for use in magnetic recording, which comprises a ferromagnetic core structure having a magnetic gap, a winding mounted on the core structure, a capacitor mounted in proximity to and connected to the winding to form a resonance circuit, and amplifying means mounted in proximity to and connected to the resonant circuit for generating an amplified alternating current in the winding.

Preferably, the oscillator's amplifier circuit comprises a pair of transistors each having a control electrode and first and second controlled electrodes, the first controlled electrodes of the transistors being connected together and the second controlled electrodes of the transistors being connected through the winding, a first conductor connected from a midpoint of the winding to a first terminal of a DC voltage source and a second conductor connected from a junction between the first controlled electrodes to a second terminal of the voltage source.

According to a second aspect of the invention, the resonance circuit further includes an additional coil connected to the winding to form an inductance element of the resonance circuit, the additional coil being mounted in proximity to the core structure.

BRIEF DESCRIPTION OF THE DRAWINGS

The present invention will be described in further detail with reference to the accompanying drawings, in which.

DETAILED DESCRIPTION

Figure 1:
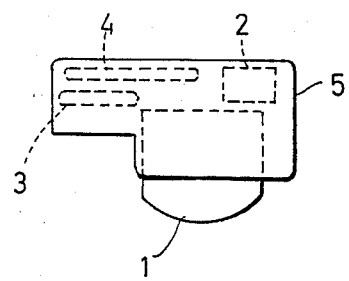
FIG. 1 is a plan view of a first embodiment of the electromagnetic transducer head.
Figure 2:
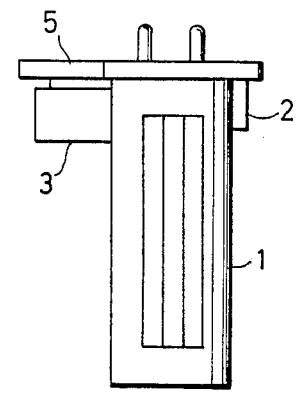
FIG. 2 is a front view of the transducer head of FIG. 1.
Figure 3:
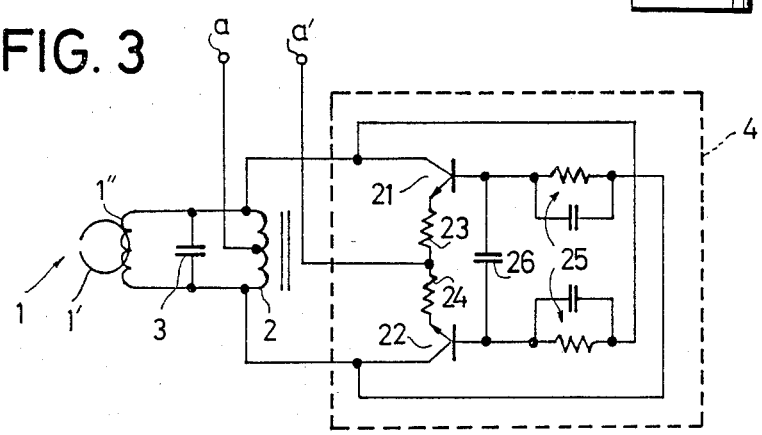
FIG. 3 is a diagram of an oscillator's amplifier circuit.

Referring to FIGS. 1 to 3, there is shown a first preferred embodiment of the electromagnetic transducer head assembly of the invention. Illustrated at 1 is a transducer head which may be an erasure head or a recording head of a tape recording apparatus. The head 1 is constructed of a ferromagnetic core 1' and a winding 1" wound on the core 1'. On the transducer head 1 is mounted an insulative circuit board 5 having various circuit elements affixed to the underside thereof. These circuit elements include a coil 2 and a capacitor 3 which form a resonance circuit of a high frequency oscillator, and a hybrid integrated-circuit amplifier section 4 of the oscillator.

The oscillator coil 2 has an intermediate tap connected to a terminal a of a DC voltage source. The ends of the oscillator coil 2 are connected to the winding of the transducer head 1 with the capacitor 3 being connected in parallel with the coil 2. The oscillator's amplifier circuit 4 is of a push-pull type which comprises a pair of n-p-n transistors 21 and 22. The collectors of transistors 21 and 22 are interconnected through the oscillator coil 2 and their emitters are interconnected by resistors 23 and 24 with the junction therebetween being connected to a second terminal a' of the DC voltage source. The base of each transistor is coupled by a parallel RC network 25 to the collector of the other transistor and further coupled by a capacitor 26 to the base of the other transistor. By application of a DC voltage to terminals a and a', the oscillator 4 initiates oscillation the frequency of which is determined by the capacitance of capacitor 3 and the inductances of head 1 and coil 2. The capacitor 3 is preferably of a styrene type to take the advantage of its small high-frequency loss. An oscillating voltage having a peak-to-peak amplitude four times higher than the source voltage is developed across the coil 2. Typically, a voltage of 31 Vpp is generated for a source voltage Vcc of 8.4 volts.

Figure 4:
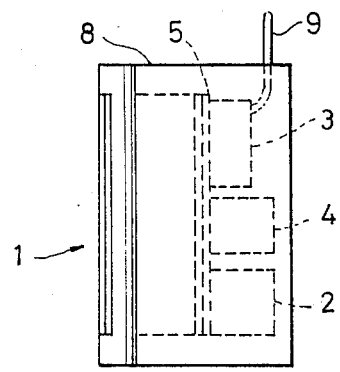
FIG. 4 is a side view of a modified form of the embodiment of FIG. 1.

Alternatively, the various circuit elements which are fixed to the circuit board 5 are also mounted in a common moulded housing 8 with the transducer head 1 as illustrated in FIG. 4. More specifically, the circuit board 5 is located at the rear side of the head 1 and connecting leads 9 of the oscillator circuit 4 are brought out for connection to the DC voltage source.

Figure 5:
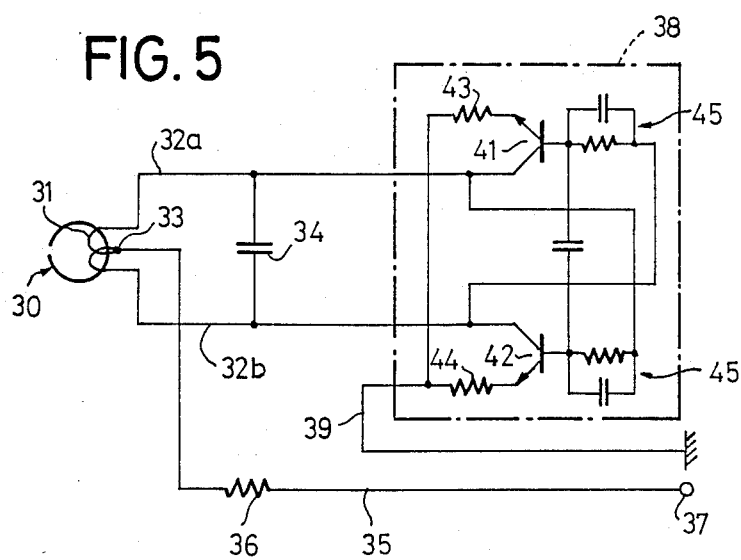
FIG. 5 is a circuit diagram of a second embodiment of the invention.
Figure 6:
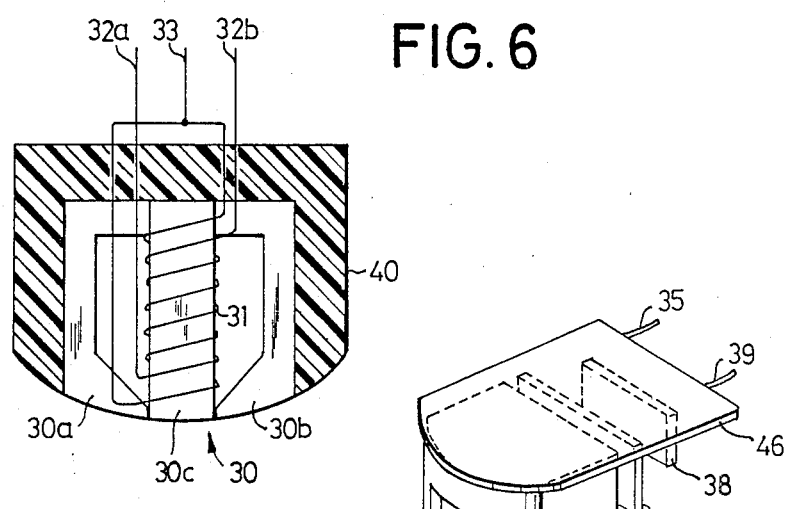
FIG. 6 is a cross-sectional view of the transducer head assembly of the second embodiment.
Figure 7:
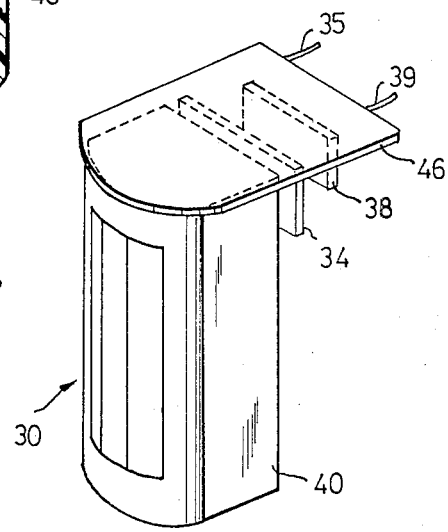
FIG. 7 is a perspective view of the transducer head assembly of the second embodiment.

A second preferred embodiment of the present invention is illustrated in FIGS. 5 to 7. This embodiment is characterized by the fact that the winding of an erasure head serves as an inductance element of the resonance circuit and as a source for generating magnetic flux lines for erasing purposes. Illustrated at 30 is the core structure of a double gap erasure head having a winding 31 coiled around the core 30. The winding 31 has its ends directly coupled by leads 32a and 32b to the collectors of transistors 41 and 42 of a push-pull amplifier circuit 38 with their emitters being interconnected by a series combination of resistors 43 and 44. The junction between the resistors 43 and 44 is connected via lead 39 to ground. The base of each transistor is coupled via an RC network 45 to the collector of the other transistor. The winding 31 has its intermediate tap 33 connected via lead 35 in series with a resistor 36 to a terminal 37 to which a DC voltage is applied. The resistor 36 serves as a means for suppressing waveform distortion. The core 30 is enclosed in a plastic mould 40 with the exception that the front face thereof where the magnetic gap exists is exposed.

A polypropylene capacitor 34 is connected across the winding 31 to form a resonant circuit therewith to generate a high frequency magnetic flux at a frequency about 65 kHz.

The core structure 30 comprises a pair of core halves 30a and 30b of generally U-shaped configuration and a center core element 30c which is disposed between the limbs of the core halves so that a pair of magnetic gaps G is formed and on which the winding 31 is mounted.

The amplifier circuit chip 38 and the capacitor 34 are mounted on a printed circuit board 46 which is in turn secured to the erasure head. The circuit board is grounded by the conductor 39.

Due to the elimination of the shielded wire and the transformer of the type as used in conventional erasing circuits, the power consumption of the present embodiment is about one-half the power consumption of the prior art circuits.

What is claimed is:

1. An electromagnetic transducer head assembly for use in magnetic recording, comprising: a ferromagnetic core structure having a magnetic gap, a winding mounted on said core structure, a capacitor mounted in proximity to and connected to the winding to form a resonance circuit, and amplifying means mounted in proximity to and connected to the resonance circuit for generating an alternating current in said winding, said amplifying means comprising a pair of transistors each having a control electrode and first and second controlled electrodes, the first controlled electrodes of said transistors being connected together and the second controlled electrodes of said transistors being connected through said winding, the second controlled electrode of each transistor being connected through a parallel combination of a resistor and a capacitor to the control electrode of the other transistor, a first conductor connected from a midpoint of said winding to a first terminal of a DC voltage source and a second conductor connected from a junction between said first controlled electrodes to a second terminal of the voltage source.

2. An electromagnetic transducer head assembly as claimed in claim 1, further comprising an insulative plate secured to said core structure, said amplifying means and said capacitor being mounted on said insulative plate.

3. An electromagnetic transducer head assembly as claimed in claim 2, wherein said amplifying means and said capacitor are mounted in a moulded common housing with said core structure.

4. A magnetic tape recording apparatus comprising: a ferromagnetic core structure having a magnetic gap, a winding mounted on said core structure, a capacitor mounted in proximity to and connected to the winding to form a resonance circuit, and amplifying means mounted in proximity to and connected to the resonance circuit for generating an alternating current in said winding, said amplifying means comprising a pair of transistors each having a control electrode and first and second controlled electrodes, the first controlled electrodes of said transistors being connected together and the second controlled electrodes of said transistors being connected through said winding, the second controlled electrode of each transistor being connected through a parallel combination of a resistor and a capacitor to the control electrode of the other transistor, a first conductor connected from a midpoint of said winding to a first terminal of a DC voltage source and a second conductor connected from a junction between said first controlled electrodes to a second terminal of the voltage source.

5. A magnetic recording apparatus as claimed in claim 4, further comprising an insulative plate secured to said core structure, and wherein said amplifying means and said capacitor are mounted on said insulative plate.

6. A magnetic recording apparatus as claimed in claim 5, wherein said amplifying means and said capacitor are mounted in a moulded common housing with said core structure.

7. A transducer head assembly for use in magnetic recording, comprising:

a ferromagnetic core having a coil wound on said core, said coil having a midpoint tap between opposite terminals thereof;

a capacitor connected to said coil to form a resonance circuit with said coil;

a push-pull amplifier comprising a pair of transistors each having a control electrode and first and second controlled electrodes, said transistors cross-coupled to one another so that the control electrode of each transistor is connected through a parallel combination of a resistor and a capacitor to the first controlled electrode of the other and to respective opposite terminals of said coil, said second controlled electrodes of said transistors connected together at a node;

means for coupling said midpoint tap and said node to a DC voltage source; and a housing means for mounting said core, said capacitor and said amplifier in a single mounting assembly.

8. A transducer head assembly for use in magnetic recording, comprising:

a ferromagnetic core having a first coil wound on said core ;

a resonance circuit comprising a capacitor and a second coil connected to the capacitor and to said first coil, the second coil having a midpoint between opposite terminals thereof;

a push-pull amplifier comprising a pair of transistors each having a control electrode and first and second controlled electrodes, said transistors cross-coupled to one another so that the control electrode of each transistor is connected through a parallel combination of a resistor and a capacitor to the first controlled electrode of the other and to respective opposite terminals of said coils, said second controlled electrodes of said transistors connected together at a node;

means for coupling said midpoint tap and said note to a DC voltage source; and a housing means for mounting said core, said capacitor and said amplifier in a single mounting assembly.

* * * * *